US007395417B2

(12) United States Patent
Johnson

(10) Patent No.: US 7,395,417 B2
(45) Date of Patent: Jul. 1, 2008

(54) REGISTER FILE BACKUP QUEUE

(75) Inventor: Anders R. Johnson, Fremont, CA (US)

(73) Assignee: Seiko Epson Corporation, Shinjuku Tokyo-to (JP)

( * ) Notice: Subject to any disclaimer, the term of this patent is extended or adjusted under 35 U.S.C. 154(b) by 153 days.

(21) Appl. No.: 10/999,005

(22) Filed: Nov. 30, 2004

(65) Prior Publication Data

US 2005/0108510 A1    May 19, 2005

Related U.S. Application Data

(63) Continuation of application No. 10/231,152, filed on Aug. 30, 2002, now Pat. No. 6,839,832, which is a continuation of application No. 10/095,071, filed on Mar. 12, 2002, now Pat. No. 6,697,936, which is a continuation of application No. 09/229,172, filed on Jan. 13, 1999, now Pat. No. 6,374,347, which is a continuation of application No. 08/771,911, filed on Dec. 23, 1996, now Pat. No. 5,881,216, which is a continuation of application No. 08/403,527, filed on Mar. 13, 1995, now Pat. No. 5,588,113, which is a continuation of application No. 07/846,237, filed on Mar. 5, 1992, now Pat. No. 5,398,330.

(51) Int. Cl.
    *G06F 11/16* (2006.01)
(52) U.S. Cl. ..................................... 712/228
(58) Field of Classification Search .................. 712/228
    See application file for complete search history.

(56) References Cited

U.S. PATENT DOCUMENTS 3,654,448 A    4/1972    Hitt (Continued)

FOREIGN PATENT DOCUMENTS

JP    54-107645    8/1979

(Continued)

OTHER PUBLICATIONS

Johnson, W.M., Super-scalar Processor Design, 1989, Technical report, Stanford University, pp. 64-122.*

(Continued)

*Primary Examiner*—Eric Coleman
(74) *Attorney, Agent, or Firm*—Sterne, Kessler, Goldstein & Fox PLLC

(57) ABSTRACT

A register file backup system for use with a computer which processes instructions to generate results which thereby change the visual state of the computer. The computer has a register file with a plurality of addressable locations for storing data. The backup system is adapted to return the visual state of the computer to a previous state if an instruction generates an exception. The backup system utilizes less overhead so as to provide easier register file backup than a comparable software or hardware device. The backup system comprises first means for sequentially storing in program order, address information corresponding to destination locations in the register file where instruction results are to be stored. The first means has first and second outputs for transferring the address information stored therein: the first output being coupled to the register file for transferring a first portion of the address information to the register file, and the second output is used for transferring a second portion of address information for backup storage of the register file contents. The backup system also has a second means coupled to (1) the second output of the first means, for receiving and storing the second portion of the address information, and (2) the register file, for receiving and backup storing further information corresponding to the contents of one or more destination locations in the register file before that destination location is changed according to second portion of the address information. A third means is used for transferring the further information from the second means back to the register file locations according to the second portion of the address information stored in the second means after an instruction generates an exception.

13 Claims, 2 Drawing Sheets

U.S. PATENT DOCUMENTS

| | | | |
|---|---|---|---|
| 3,736,566 A | | 5/1973 | Anderson et al. |
| 4,044,337 A | | 8/1977 | Hicks et al. |
| 4,115,854 A | | 9/1978 | Capowski et al. |
| 4,287,560 A | | 9/1981 | Forbes et al. |
| 4,385,365 A | | 5/1983 | Hashimoto et al. |
| 4,584,644 A | * | 4/1986 | Larner ..................... 710/260 |
| 4,592,019 A | * | 5/1986 | Huang et al. ........... 365/189.05 |
| 4,777,594 A | | 10/1988 | Jones et al. |
| 4,912,707 A | | 3/1990 | Kogge et al. |
| 5,023,828 A | | 6/1991 | Grundmann et al. |
| 5,081,572 A | * | 1/1992 | Arnold ..................... 711/163 |
| 5,119,483 A | | 6/1992 | Madden et al. |
| 5,146,569 A | | 9/1992 | Yamaguchi et al. |
| 5,148,536 A | | 9/1992 | Witek et al. |
| 5,197,132 A | | 3/1993 | Steely, Jr. et al. |
| 5,291,589 A | | 3/1994 | Matsuura et al. |
| 5,303,378 A | | 4/1994 | Cohen |
| 5,319,766 A | | 6/1994 | Thaller et al. |
| 5,325,520 A | | 6/1994 | Nguyen et al. |
| 5,398,330 A | | 3/1995 | Johnson |
| 5,423,011 A | | 6/1995 | Blaner et al. |
| 5,430,888 A | | 7/1995 | Witek et al. |
| 5,588,113 A | | 12/1996 | Johnson |
| 5,590,294 A | | 12/1996 | Mirapuri et al. |
| 5,651,125 A | | 7/1997 | Witt et al. |
| 5,862,400 A | | 1/1999 | Reed et al. |
| 5,870,612 A | * | 2/1999 | Cheong et al. .............. 710/260 |
| 5,881,216 A | | 3/1999 | Johnson |
| 6,070,235 A | * | 5/2000 | Cheong et al. ................ 712/23 |
| 6,374,347 B1 | | 4/2002 | Johnson |
| 6,697,936 B2 | | 2/2004 | Johnson |

FOREIGN PATENT DOCUMENTS

| | | |
|---|---|---|
| JP | 59-172044 | 9/1984 |
| JP | 59-178667 | 10/1984 |
| JP | S61-166636 A | 7/1986 |
| JP | 1-100638 | 4/1989 |
| JP | 3-269628 | 12/1991 |
| JP | H05-46390 A | 2/1993 |

OTHER PUBLICATIONS

Chang, JH etal., Roll-Back Interrupt Method for Out of Order System Programs, IBM Technical Disclosure Bulletin Oct. 1989, pp. 1-4.*

Hwu, W.-M. W. et al., "Checkpoint Repair for High-Performance Out-of-Order Execution Machines," IEEE Trans. on Computers, IEEE, vol. C-36, No. 12, pp. 1496-1514 (Dec. 1987).

"Roll-Back Interrupt Method for Out-of-Order Execution of System Programs," IBM Technical Disclosure Bulletin, IBM Corp., vol. 32, No. 5A, pp. 33-36 (Oct. 1989).

Smith, J.E. and Pleszkun, A.R., "Implementation of Precise Interrupts in Pipelined Processors," Proceedings of the 12th International Symposium on Computer Architecture, IEEE, pp. 36-44 (Jun. 1985).

"Use of a Second Set of General Purpose Registers to Allow Changing General Purpose Registers During Conditional Branch Resolution,", IBM Technical Disclosure Bulletin, IBM Corp., vol. 29, No. 3, pp. 991-993 (Aug. 1986).

Notification of Reason for Rejection, issued in Japanese Application No. H5-515521, dated Sep. 9, 2003, 2 pages, (English language translation provided).

* cited by examiner

REGISTER FILE BACKUP QUEUE

CROSS-REFERENCE TO RELATED APPLICATIONS

This application is a continuation of application Ser. No. 10/231,152, filed Aug. 30, 2002, now U.S. Pat. No. 6,839,832 now allowed, which is a continuation of application Ser. No. 10/095,071, filed Mar. 12, 2002, now U.S. Pat. No. 6,697,936, which is a continuation of application Ser. No. 09/229,172, filed Jan. 13, 1999, now U.S. Pat. No. 6,374,347, which is a continuation of application Ser. No. 08/771,911, filed Dec. 23, 1996, now U.S. Pat. No. 5,881,216, which is a continuation of application Ser. No. 08/403,527, filed Mar. 13, 1995, now U.S. Pat. No. 5,588,113, which is a continuation of application Ser. No. 07/846,237, filed Mar. 5, 1992, now U.S. Pat. No. 5,398,330.

BACKGROUND OF THE INVENTION

1. Field of the Invention

The present invention relates to the management of the program-visible machine state of computers, and more particularly, to a computer register file system and method adapted to handle exceptions which prematurely overwrite register file contents.

2. Related Art

A more detailed description of some of the basic concepts discussed in this application is found in a number of references, including Mike Johnson, *Superscalar Microprocessor Design* (Prentice-Hall, Inc., Englewood Cliffs, N.J., 1991); John L. Hennessy et al., *Computer Architecture—A Quantitative Approach* (Morgan Kaufmann Publishers, Inc., San Mateo, Calif., 1990). Johnson's text, particularly Chapter 5, provides an excellent discussion of register file exception handling.

Supporting exception handling and in particular precise interrupts, presents a complicated set of problems for the computer architect. For example, the result of a particular instruction cannot be written to a central processor unit's (CPU) register file, or any other part of the program-visible machine state, until after it can be determined that the instruction will not signal any exceptions. Otherwise, the instruction will have an effect on the visible state of the machine after the exception is signaled. (The terms CPU, computer and processor will be used interchangeably throughout this document).

Historically, this problem has been circumvented by increasing the number of processor pipeline stages (pipeline depth) so that the write does not occur until after the latest exception is determined. However, this reduces the allowable degree of instruction interlocking and/or increases the amount of by-pass circuitry required, either of which typically degrades overall performance.

The concept of a "history buffer" is described by J. E. Smith et al. ("Implementation of Precise Interrupts in Pipelined Processors", *Proceedings of the 12th Annual International Symposium on Computer Architecture* (June 1985), pp. 36-44), as a means for implementing precise interrupts in a pipeline scalar processor with out-of-order completion. In this approach, the register file contains the program-visible state of the machine, and the history buffer stores items of the in-order state which have been superseded by items of lookahead state (i.e., it contains old values that have been replaced by new values; hence the name history buffer).

The history buffer is managed as a circular buffer. Each entry in the history buffer is assigned an entry number. There are n entries in the history buffer, where n corresponds to the length of the longest functional unit pipeline. A head and a tail tag are used to identify the head of the buffer, and the entry in the buffer reserved for the instruction, respectively. Entries between the head and tail are considered valid.

At issue time, each history buffer entry is loaded with: (1) the value of the register file prior to the issuing of the instruction, and control information including: (2) a destination register of the result, (3) the program counter, and (4) either an exception bit or a validity bit, depending on whether an exception is generated at the time of issue.

A Result Shift Register is used in conjunction with the history buffer to manage various machine control signals, including a reorder tag which is required to properly restore the state of the machine due to out-of-order completion. The result shift register includes entries for the functional unit that will be supplying the result and the destination register of the result. The result shift register is operated as a first-in first-out (FIFO) stack.

Results on a result bus from the processor's functional unit(s) are written directly into the register file when an instruction completes. Exception reports come back as an instruction completes and are written into the history buffer. The exception reports are guided to the proper history buffer entry through the use of tags found in the result shift register. When the history buffer contains an element at the head that is known to have finished without exceptions, the history buffer entry is no longer needed and that buffer location can be re-used (the head pointer is incremented). The history buffer can be shorter than the maximum number of pipeline stages. If all history buffer entries are used (the buffer is too small), issue must be blocked until an entry becomes available. Hence, history buffers are made long enough so that this seldom happens.

When an exception condition arrives at the head of the history buffer, the buffer is held, instruction issue is immediately halted, and there is a wait until pipeline activity completes. The active buffer entries are then emptied from tail to head, and the history values are loaded back into their original registers. The program counter value found in the head of the history is the precise program counter.

The extra hardware required by this method is in the form of a large buffer to contain the history information. Also the register file must have three read ports since the destination value as well as the source operands must be read at issue time.

In view of the forgoing, it is clear that a simplified backup system is therefore required to handle exceptions.

BRIEF SUMMARY OF THE INVENTION

The present invention is directed to a register file backup queue system and method for use with a computer which processes instructions to generate results which thereby change the visual state of the computer. The computer has a register file with a plurality of addressable locations for storing data. The backup system of the present invention is adapted to return the visual state of the computer to a previous state if an instruction generates an exception. The backup system utilizes less overhead so as to provide easier register file backup than a comparable software or hardware device.

The present invention sequentially stores in program order in a result tag queue, address information corresponding to destination locations in the register file where instruction results are to be stored.

From the result tag queue, a first portion of the address information is transferred to the register file and a second portion of address information is transferred to a backup queue for backup storage of the register file contents.

The backup queue also receives and stores further information corresponding to the contents of one or more destination locations in the register file before that destination location is changed according to said second portion of said address information.

The present invention transfers said further information from said backup queue back to the register file locations according to said second portion of said address information stored in said backup queue if an instruction exception is generated.

Before an instruction is retired, the value of any program-visible state that an instruction may modify (including, but not limited to, the prior value of the register file destination register) is read such that all instructions up to and including the previous instruction have taken effect prior to the read. The resulting data are placed in the backup queue that, in effect, "remembers" the program-visible state of the processor exactly prior to any given "uncommitted instruction", and thus can be used to nullify the effect of any instruction that causes an exception. (An "uncommitted instruction" is defined by Hennessy et al. as an instruction that may cause an exception at some future time.)

The present invention thus provides a mechanism by which interrupts can be supported for exceptions that are signaled after the result is written and without out-of-order completion. Design complexity is minimally increased, in that the pipeline depth of the processor does not need to be increased to handle the late-exception case. This approach is easier to "tack on" to an existing design (e.g., in the case that an enhancement makes the late-exception case possible where it was not possible before) than increasing the pipeline depth. In some configurations, overall performance is not significantly impacted, except in the case that an exception occurs.

The foregoing and other features and advantages of the present invention will be apparent from the following more particular description of the preferred embodiments of the invention, as illustrated in the accompanying drawings.

BRIEF DESCRIPTION OF THE DRAWINGS/FIGURES

The invention will be better understood if reference is made to the accompanying drawings in which.

DETAILED DESCRIPTION OF THE INVENTION

The operation of the invention is illustrated with reference to a representative block diagram shown in FIG. 1.

Figure 1:
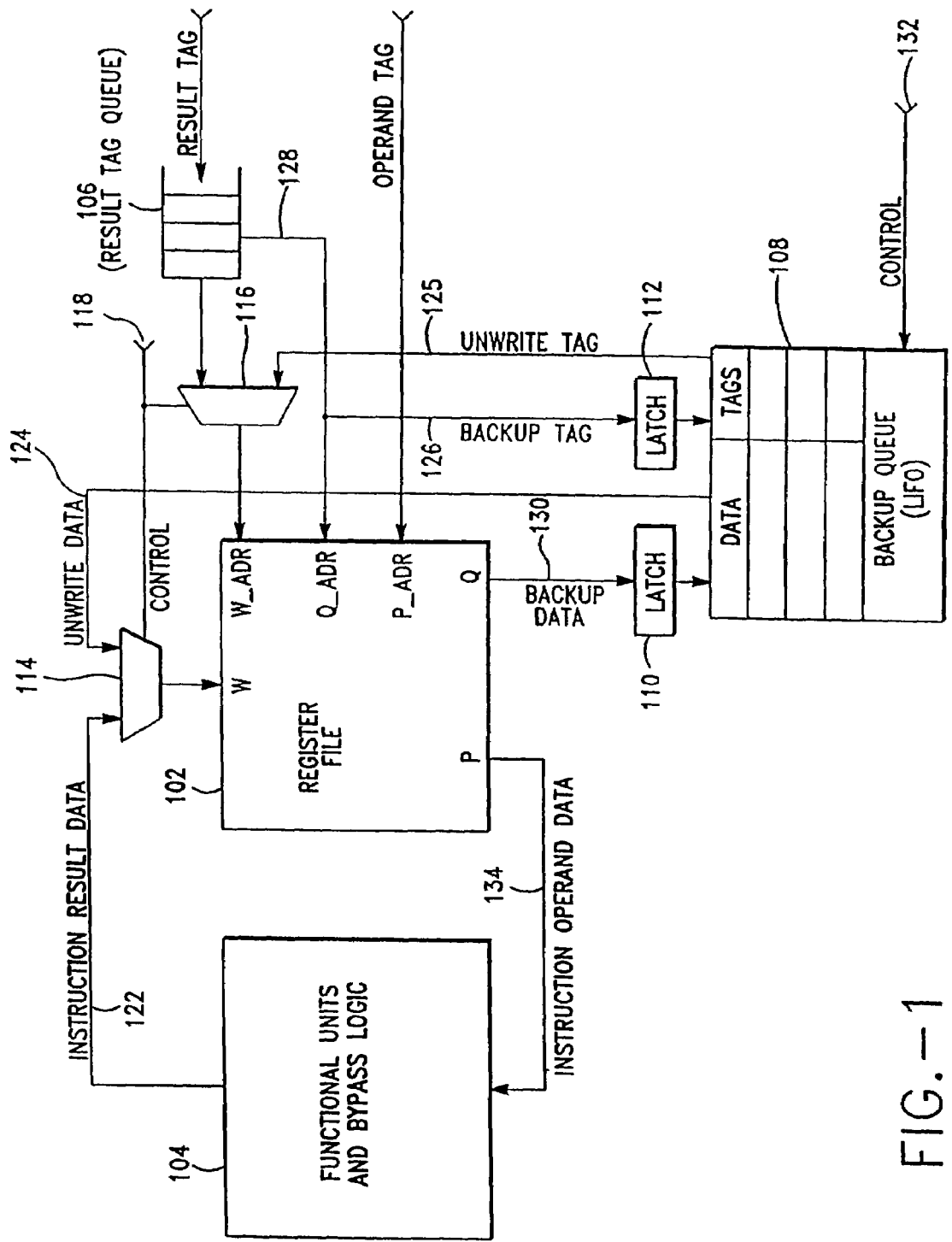
FIG. 1 shows a representative block diagram of a register file backup queue system of the present invention.

In this example, the computer register file system environment of the present invention as shown in FIG. 1 comprises a register file 102 having a plurality of addressable locations for storing instruction operands and results, functional units and bypass logic 104, a result tag queue 106 for storing information corresponding to the address of the register file location that is designated by the instruction to store results (also called result tag), a backup queue 108, a backup data latch 110, a backup tag latch 112, a data multiplexer 114 and an address/tag multiplexer 116.

In the above example it is easiest to think of the block 102 as a register file of a central processor unit (also called the processor, CPU or computer), but the present invention applies to any part of (or the entirety of) the program-visible machine state without loss of generality.

Register file 102 includes a P_adr input to receive information corresponding to the address(es) of the register(s) storing the operand(s) of the instruction (also called operand tags). The operands are stored in register file 102 and are passed to functional units 104 via a bus 134 for execution of the instruction in a conventional manner.

In addition to reading the operands of the instruction, the system determines the destination register to receive the results of the instruction. The system then reads the contents of that destination register prior to execution of the instruction and stores the contents and a tag (e.g., the address of the register file entry, for example) corresponding to the destination register into backup queue 108. In the event of an exception (e.g., an arithmetic exception such as an add overflow), the state of register file 102 prior to the exception can be restored by reading the contents of backup queue 108 and storing that data back into register file 102 at the location specified by the corresponding tag.

To coordinate backup of data in register file 102 a result tag queue 106 is required. Result tag queue 106 stores tags corresponding to the destination location in register file 102 for storing instruction results. Result tags are generated by decoding the instructions in a conventional manner. The tags stored in result tag queue 106 are stored in a first-in-first-out manner in execution order. Result tag queue 106 delays the tag until the previous instructions have completed in case they write to the same destination location in the register file.

The depth of backup queue 108 depends on the number of pipeline stages (i.e., cycles) between the cycle the register file is written and the cycle that an exception is detected.

One embodiment of the present invention comprises a three stage pipeline with fetch, decode and execute/store operations. In this embodiment, an exception can only be signaled during the same cycle that register file 102 is written. Therefore, backup queue 108 only needs to be deep enough to store the contents of one destination register and its tag.

Conventionally, if several instruction results are written to register file 102 and an exception occurs after a multi-cycle pipeline delay, the result is that many states of the machine would be wiped out by the late signaled exception. In the present invention, however, by deepening the backup queue 108 the lost states can be recovered in order to be able to restore those lost states. Before the exception can be handled, all previous results (those in the register file before the instruction executed) must be written back into register file 102 up to the instruction preceding the instruction that generated the exception.

As appreciated by those skilled in the art, signals that indicate whether a data exception (for example) has occurred originate in the data path and are detected by control logic (not shown). Control logic then determines what to do and generates a control signal 118 (shown in FIG. 1) which selects one of the sets of inputs of MUXs 114 and 116.

Under normal operation (i.e., no exception), control signal 118 controls MUX 114 to select "instruction result data" 122 from functional units 104 to pass the results to register file 102's write port W.

If an exception is detected, control signal 118 controls MUX 114 to select "unwrite data" 124 from backup queue 108 to return the state of the register file to the state that it was in just prior to the instruction that caused the exception. The unwrite data 124 is that data on the top of the backup queue 108.

Similarly, under normal operation (i.e., no exception), control signal 118 controls MUX 116 to select a result tag from the top of result tag queue 106 to a write address input W_adr of register file 102. If an exception is detected, control signal 118 controls MUX 116 to select an "unwrite tag" 125 from backup queue 108 to instruct register file 102 where to store the unwrite data.

The backup of data will now be discussed. As shown in FIG. 1, register file 102 also includes an input port "Q_adr" for receiving information concerning instruction operands from result tag queue 106. The Q_adr input port receives a "backup tag" 126 from result tag queue 106 corresponding to the data that is to be written into the backup queue 108. In this example, a bus 128 is shown connected to the entry of result tag queue 106 that is to be written to the register file 102 in the next cycle. At the same time a result tag is sent to the Q_adr input it is sent via bus 128 to backup queue 108 and is temporarily stored in a tag latch 112. This permits the present invention to store the results to be overwritten by the next instruction in backup queue 108. Register file 102 outputs the "backup data" 130 corresponding to the backup tag 126 via a data output port "Q". Backup data 130 is sent to a data latch 110 so that its corresponding backup tag 126, which arrived earlier at tag latch 112, can be latched into backup queue 108 at the same time.

A control line 132 is provided to switch the direction of stacking of backup queue 108. In normal operation, backup data and backup tags are pushed into backup queue 108. As noted above, the depth of backup queue 108 depends on the length of the pipeline. In this example the backup queue 108 has a depth of one. Depending on its depth, old information is said to be "pushed out of the bottom" of the stack when the last entry is written over by newer information. If an exception is detected, control signal 132 reverses the direction of backup queue 108 and information is popped off in a last-in, first-out fashion, and is stored back into register file 102.

The process of unwriting can be controlled either by hardware or by the operating system in software. However, if the operating system does it, then care must be taken to ensure that the instructions that control the process do not write into backup queue 108 themselves; that is, there must be a mechanism for disabling the queue before the exception handler is invoked.

In a preferred embodiment of the present invention, an additional read port (i.e., in addition to the P port) is not required because the read stage and write state are separated by exactly one cycle, and one of the following conditions is satisfied:

1. There are instructions that cannot generate late exceptions that require a read port in addition to those required by instructions that can generate late exceptions, and the depth of backup queue 108 is exactly 1 (i.e., the latest exception signals exactly one cycle too late to abort the corresponding write).
2. Every instruction that requires the maximum number of read ports always writes to the same register number as one of its arguments.

If one of the previous conditions is satisfied, but the read stage and the write stage are separated by more than one cycle, then the present invention is still applicable without increasing the number of register-file read ports. In this case, it is necessary to read into backup queue 108 at the read stage instead of the stage before write, and to deepen backup queue 108. This, however, is not optimum because the additional interlock (from the result of a previous instruction to the backup read) may degrade performance.

Figure 2:
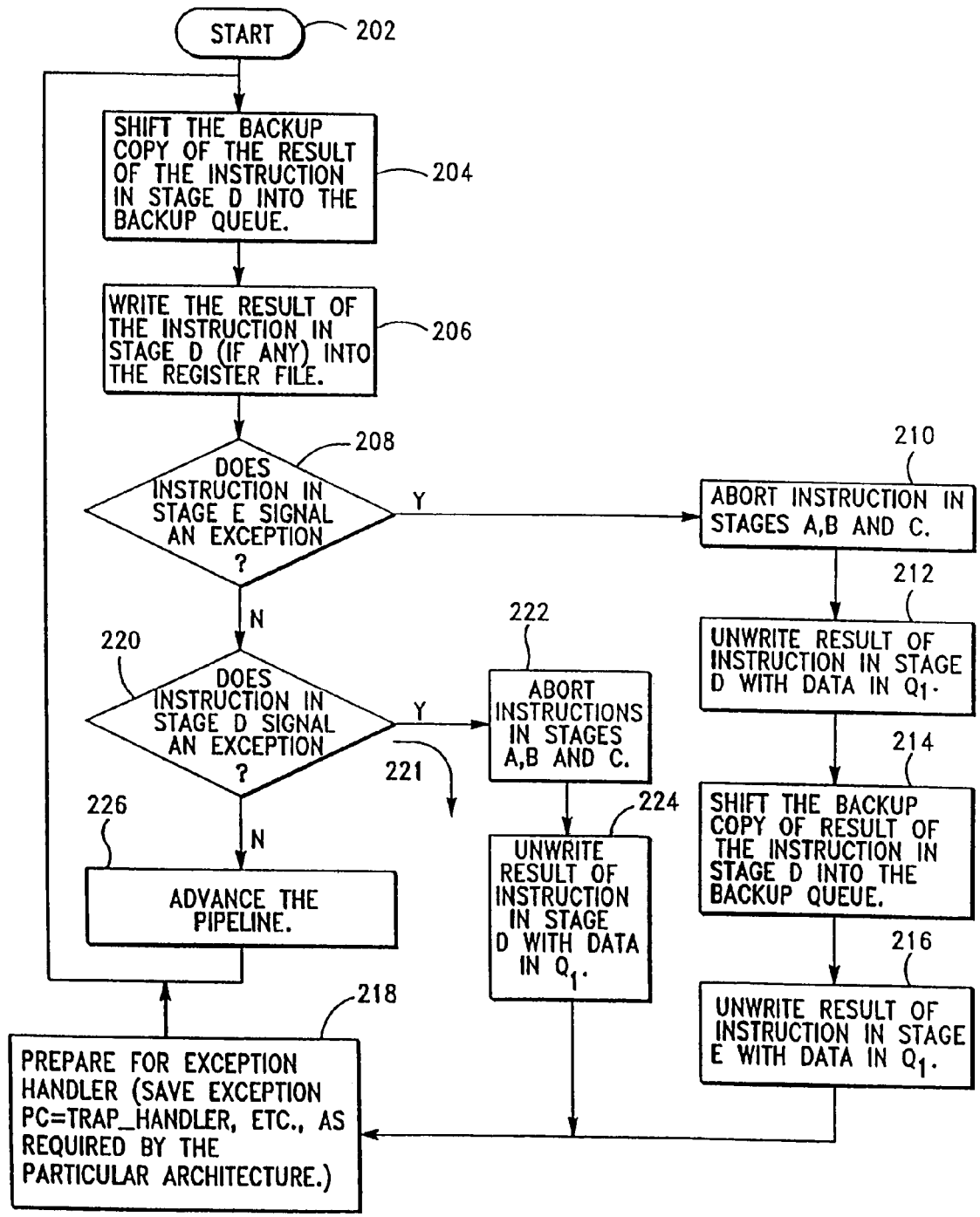
FIG. 2 is a representative flow chart showing the basic steps taken by the register file backup queue system of the present invention.

As an example of the present invention, consider a machine with 5 pipeline stages A, B, C, D, and E, as shown below in Table 1. A representative flow chart of this example is shown in FIG. 2. Table 1 and FIG. 2 will be referred to jointly in the following discussion. The write occurs in stage D. An exception can occur in state E. Exceptions that signal after stage C of an instruction cannot prevent that instruction from writing. (Reads can occur in any of stages A, B or C without relevance to this example.) Backup queue 108 of the present invention must be two storage locations deep because exceptions can signal two cycles too late to prevent the corresponding write.

In Table 1, the cycle numbers 1-9 are shown along the top, and instructions i through i+4 and backup queue storage locations $Q_1$ and $Q_2$ are shown along the left hand side.

TABLE 1

Example Pipeline with Backup Queue

| | Cycle Number | | | | | | | | |
|---|---|---|---|---|---|---|---|---|---|
| | 1 | 2 | 3 | 4 | 5 | 6 | 7 | 8 | 9 |
| i* | A | B | C | D | E | | | | |
| i + 1* | | A | B | C | D | E | | | |
| i + 2* | | | A | B | C | D | E*** | | |
| i + 3* | | | | A | B | C | D | | |
| i + 4* | | | | | A | B | C | | |
| $Q_1$** | i – 3 | i – 2 | i – 1 | i | i + 1 | i + 2 | i + 3 | i + 3 | i + 2 |
| $Q_2$** | i – 4 | i – 3 | i – 2 | i – 1 | i | i + 1 | i + 2 | i + 2 | |

*Instruction Number
**Backup Queue
***Exception Signaled

The backup and exception detection of instruction i+2 is shown in FIG. 2. The operation starts at a step 202. Instruction i+2 is backed up into backup queue $Q_1$ at stage D in cycle 6, as shown in a step 204. The result of instruction D is sent to the register file, as shown at a step 206. Suppose an exception is caused by instruction i+2 and signals in cycle 7 (see the yes branch "Y" at a conditional step 208). At this point, the instructions in stages A, B (not shown in cycle 7) and C are aborted (see a step 210), but the results of all instructions through instruction i+3 have already been written. However, from the program's viewpoint, instructions i+2 and i+3 should not have affected the state because of the exception. The state overwritten by these two instructions is stored in the backup queue (see a step 212). The data in $Q_1$ is written back into the register file at the destination address of instruction i+3 in cycle 8 (see a step 214). Then the backup queue shifts in the reverse direction and the data in $Q_1$ is written back at the destination of instruction i+2 in cycle 9 (see a step 216). The entire visible state now has an appropriate value for the first instruction of the exception handler to be fetched and executed (see a step 218).

Note that if instruction i+2 did not signal an exception in stage E and instruction i+3 signaled an exception in stage D, then the process would be much the same, except that instruction i+2 would not be nullified. (See loop 221 comprising steps 222 and 224.) If no exception is detected, the pipeline is merely advanced, as shown in a step 226, and execution continues.

In a further embodiment of the present invention, it is possible to use this invention to manage part of the visible state while deepening the pipeline for the remainder of the state. The most likely application is to use a backup queue for the register file(s) while delaying the retire for status bits, since it may be possible to implement bypass logic for the status bits without degrading performance.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents.

What is claimed is:

1. A method for processing instructions in a microprocessor, comprising:
   determining that a result of an instruction is to be written to a destination register in a register file that includes a plurality of registers that define a program-visible machine state of the microprocessor, the destination register identified by a result tag provided from a result tag queue;
   storing a copy of the contents of the destination register in a backup queue coupled to the register file prior to the writing of the result thereto, thereby providing a backup copy of the program-visible machine state of the microprocessor; and
   writing the result to the destination register.

2. The method of claim 1, wherein writing the result to the destination register comprises writing the result to a register identified by a result tag provided from a first-in, first-out (FIFO) result tag queue.

3. The method of claim 1, wherein storing a copy of the contents of the destination register in a backup queue comprises storing in the backup queue a copy of the contents of a register identified by a next instruction result tag provided from the result tag queue.

4. The method of claim 3, wherein storing a copy of the contents of the destination register in a backup queue further comprises storing the next instruction result tag along with the copy of the contents of the register identified by the next instruction result tag in the backup queue.

5. The method of claim 1, wherein storing a copy of the contents of the destination register in a backup queue comprises storing a copy of the contents of the destination register in a last-in, first-out (LIFO) backup queue.

6. The method of claim 1, wherein storing a copy of the contents of the destination register in a backup queue comprises storing a copy of the contents of the destination register in a backup queue having a depth that is greater than or equal to a number of pipeline stages in the microprocessor between a first stage in which results are written to the register file and a last stage in which an exception may be detected by the microprocessor.

7. The method of claim 1, further comprising:
   writing the copy of the contents of the destination register from the backup queue back to the destination register responsive to the detection of an exception by the microprocessor.

8. A method for handling an exception in a microprocessor, wherein the microprocessor stores instruction results in a register file comprising a plurality of registers, the method comprising:
   determining that an exception has occurred; and
   writing contents of a backup queue into one or more selected registers in the register file responsive to the occurrence of the exception, thereby restoring the program-visible machine state of the microprocessor to a state that existed immediately prior to the occurrence of the exception, wherein each of the one or more selected registers are identified by a tag associated with an entry in the backup queue, the backup queue tag originating from a result tag provided from a result tag queue.

9. The method of claim 8, wherein determining that an exception has occurred comprises:
   determining that an interrupt has occurred.

10. The method of claim 8, wherein writing the contents of a backup queue into one or more selected registers in the register file comprises:
    writing the contents of a last-in, first-out (LIFO) backup queue into one or more selected registers in the register file.

11. The method of claim 8, wherein writing the contents of a backup queue into one or more selected registers in the register file comprises:
    writing the contents of a backup queue having a depth that is greater than or equal to a number of pipeline stages in the microprocessor between a first stage in which results are written to the register file and a last stage in which an exception may be detected by the microprocessor.

12. The method of claim 8, further comprising:
    asserting a signal that controls a multiplexer to select the tag associated with the entry from the backup queue rather than the tag from the result tag queue for writing the entry to the register file.

13. The method of claim 8, further comprising:
    asserting a signal that controls a multiplexer to select the entry from the backup queue rather than instruction result data for writing to a register in the register file.

* * * * *